United States Patent [19]

Imamura et al.

[11] 4,266,417
[45] May 12, 1981

[54] STEEL FLANGED WHEEL RIMS FOR MOTORIZED BICYCLES OR TWO-WHEELED VEHICLES AND A PROCESS FOR PRODUCING THE RIMS

[75] Inventors: Kazuo Imamura; Toshio Minamoto, both of Kaga, Japan

[73] Assignee: Daido Kogyo Co., Ltd., Ishikawa, Japan

[21] Appl. No.: 31,026

[22] Filed: Apr. 18, 1979

[30] Foreign Application Priority Data

May 9, 1978 [JP] Japan ................................ 53-54096

[51] Int. Cl.³ .......................... B21D 5/08; B21D 11/10
[52] U.S. Cl. .................................... 72/168; 29/159.1; 72/177; 72/167; 72/171
[58] Field of Search ................ 72/167, 168, 177, 170, 72/171, 173–175, 181, 166

[56] References Cited

U.S. PATENT DOCUMENTS 2,365,882 12/1944 Kane ...................................... 72/167
4,164,133 8/1979 Damman ............................ 72/175 X

FOREIGN PATENT DOCUMENTS 468476 9/1937 United Kingdom ...................... 72/168

Primary Examiner—Milton S. Mehr
Attorney, Agent, or Firm—Wenderoth, Lind & Ponack

[57] ABSTRACT

A steel flanged wheel rim includes a pair of hollow ears extending radially and outwardly at the side edges of the rim, a semi-circular recess between the ears and a flange extending radially and inwardly from the center of the recess. The steel flanged wheel rim is produced by plastically processing through a series of shaping rolls in different processing stages and then bending the band into a ring shape to thereby continuously produce steel flanged wheel rims.

2 Claims, 12 Drawing Figures

STEEL FLANGED WHEEL RIMS FOR MOTORIZED BICYCLES OR TWO-WHEELED VEHICLES AND A PROCESS FOR PRODUCING THE RIMS

BACKGROUND OF THE INVENTION

This invention relates to steel flanged wheel rims for motorized bicycles or two-wheeled vehicles and a process for producing the rims.

There have been proposed and practically employed a variety of steel flanged wheel rims and one of the prior art steel flanged wheel rims is produced by curling a steel plate blank 2 at the opposite side edges thereof by a series of rolls in a roll-type shaping machine so as to form a pair of hollow ears 3, 3 extending radially and outwardly in a complete wheel rim, welding the free ends of the curled hollow ears to adjacent areas of the blank, recessing the center area of the width of the blank so as to form a tire receiving semi-circular recess 6, bending the processed blank into a ring shape, cutting the ring to the peripheral length of the beads 7 and flash-butt-welding the cut faces together to make the ring endless (see FIGS. 1 and 2). The thus produced wheel rim 1 then has formed therein a number of spoke holes 8 in the seat of the semi-circular recess 6, wire spokes 10 are inserted into the spoke holes in different three-dimensional orientations, and a hub is then connected to the other ends of the spokes.

In a motorized bicycle or two-wheeled vehicle which has been developed recently, as shown in FIG. 3, plate spokes 11 have been frequently employed in place of the conventional wire spokes 10 and thus, to be used in conjunction with the plate spokes 11, the rim is required to have a flange. The conventional rim 12 as shown in the FIG. 3 is produced by bending an extruded or drawn preformed aluminum alloy blank by a bending roll. However, although aluminum alloy has a high ductility and can be easily bent, since the metal is expensive and employed in the form of a preformed blank, the material expense for such a rim is high, and aluminum is inferior to steel in workability for various applications. Therefore, a steel flanged wheel rim is highly desired.

In order to meet this desire, the steel flanged wheel rim 13 as shown in FIG. 4 has been proposed. Like the conventional wheel rim 1 as described in connection with FIGS. 1 and 2, the steel flanged wheel rim includes the pair of spaced and parallel hollow ears 14, 14, beads 15, 15 and semi-circular recess 16, but the rim 13 further has a flange 17 of T-shaped cross-section welded to the semi-circular recess 16 on the side thereof opposite to the hollow ears 14, 14. The provision of the separate flange 17 on the rim proper makes the production procedure complicated and increases the production cost. Furthermore, when the preformed rim blank is bent into a ring shape, the leg portions 17a, 17a of the flange 17 tend to corrugate and thus, the flange 17 is not applicable to small diameter wheel rims.

SUMMARY OF THE INVENTION

Therefore, the object of the present invention is to provide a process for producing a novel and improved steel flanged wheel rim which can effectively eliminate the disadvantages inherent in the conventional wheel rims.

According to the present invention, there is provided a process for producing a unitary steel flanged wheel rim by plastically deforming a steel band through a series of shaping rolls in successive stages and bending the plastically deformed steel band into a ring by a bending machine in which opposing upper and lower feed rolls are arranged so as to closely contact the opposite sides of the steel band in the bending stage. The upper feed roll applies pressure and the lower feed roll is a split roll comprising two half portions having a clearance defined therebetween for receiving the flange to hold the flange under lateral compressive force.

According to the present invention, there is thus formed a steel flanged wheel rim having a rim body including a pair of spaced and parallel ears extending radially and outwardly at the opposite side edges of the rim body, a recess formed in the rim body between the ears for forming the bottom of a tire and a flange extending radially and inwardly of the rim body in the center of the rim body, the ears being hollow and the flange having a substantially U-shaped configuration.

The above and other objects and attendant advantages of the present invention will be more readily apparent to those skilled in the art from a reading of the following detailed description in conjunction with the accompanying drawings which show one preferred embodiment of the present invention, but not for limiting the scope of the same in any way.

PREFERRED EMBODIMENT OF THE INVENTION

Figure 1:
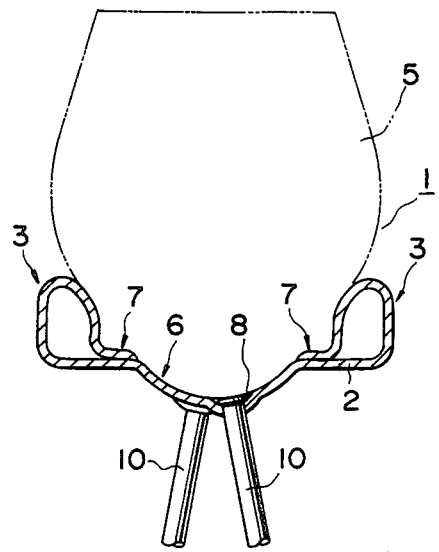
FIG. 1 is a front elevational view in cross-section of one prior art wheel rim adapted to be connected to the hub of a wheel by means of wire spokes.
Figure 2:
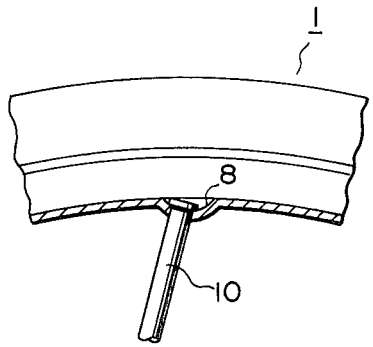
FIG. 2 is a fragmentary side elevational view in section of the wheel rim as shown in FIG. 1.
Figure 4:
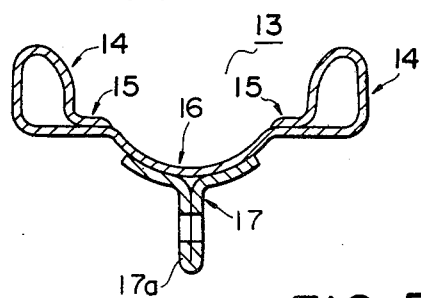
FIG. 4 is a cross-sectional view of one prior art flanged wheel rim.
Figure 3:
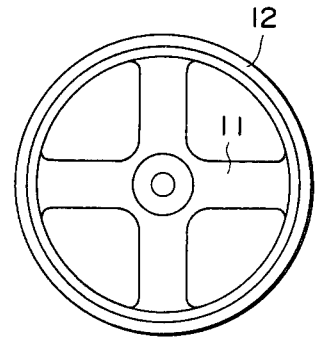
FIG. 3 is side elevational view of one prior art wheel in which the rim is connected to the hub by means of plate spokes.
Figure 5:
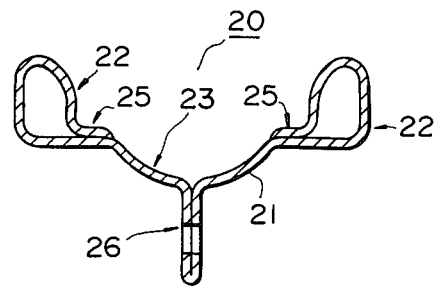
FIG. 5 is a cross-sectional view of a substantially complete flanged wheel rim produced by the process of the present invention.

The present invention will be now described referring to the accompanying drawings which show one preferred embodiment of the present invention. One embodiment of a steel flanged wheel rim formed by the process of the present invention is shown by reference numeral 20 in FIG. 5 (in a substantially complete condition). As shown in FIG. 5, the steel flanged wheel rim 20 comprises a unitary band steel rim body 21 which has a pair of spaced and parallel hollow ears 22, 22 extending from one side of the rim body at the opposite side edges thereof, a semi-circular recess 23 formed in the rim body 21 between the ears 22, 22 with the apex of the recess directing to the wheel hub (not shown) when the rim is connected to wheel hub and a pair of beads 25, 25 formed on the rim body between the ears 22 and recess 23. The rim body 21 further includes a double-layered flange 26 formed on the side of the recess 23 opposite to the ears 22, 22 in the center of the width of the rim body 21 and extending radially inwardly from the rim body.

Figure 6A:
FIGS. 6a, 6b, 6c, 6d and 6e are cross-sectional views showing a series of processing steps in the production of the flanged wheel rim as shown in FIG. 5.
Figure 6B:
Figure 6C:
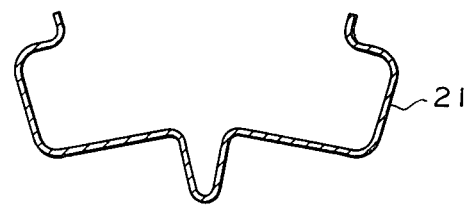
Figure 6D:
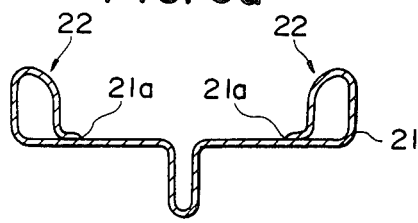
Figure 7:
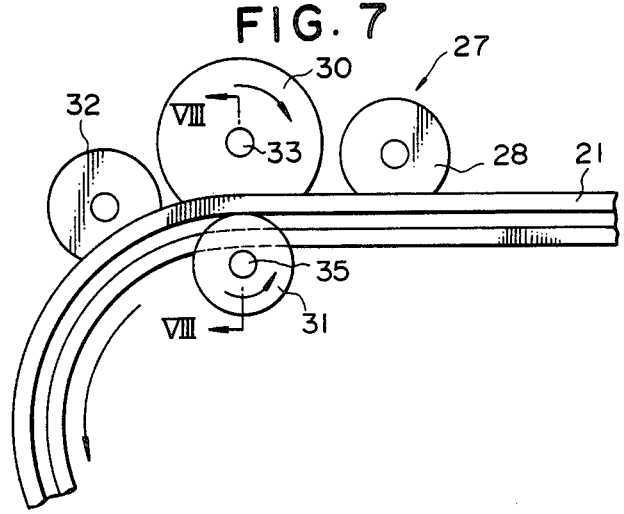
FIG. 7 is a schematic side elevational view showing the bending step in the production of the steel flanged wheel rim in accordance with the present invention.
Figure 8:
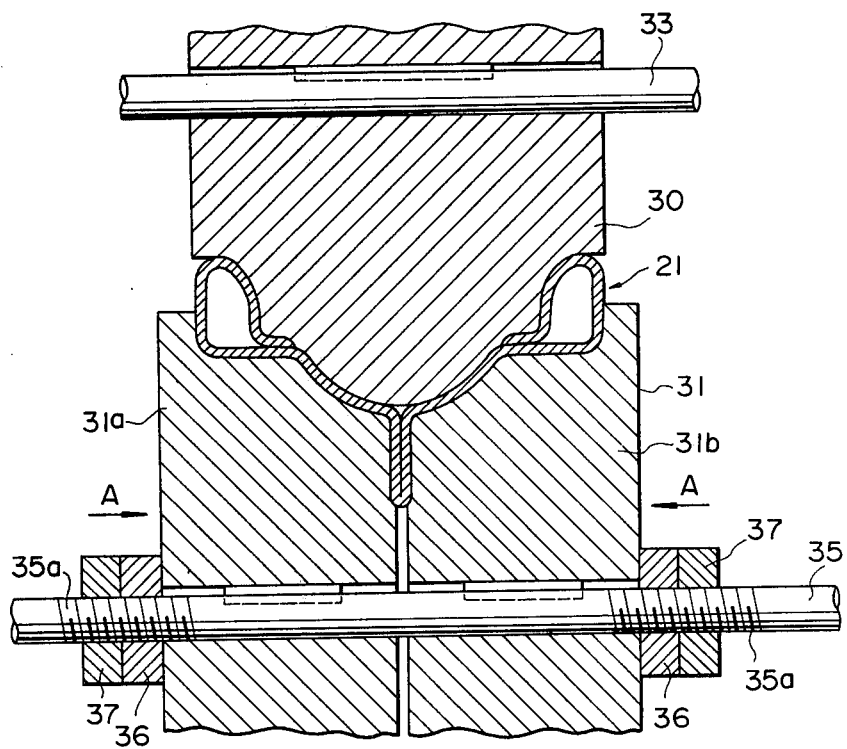
FIG. 8 is a fragmentary cross-sectional view taken substantially along the line VIII—VIII of FIG. 7.

As more clearly shown in FIGS. 6a–6e, the steel flanged wheel rim 20 is produced by passing a band of steel material 21 payed out of a band steel roll through a series of shaping rolls (not shown) provided in successive processing stages. In the first processing stage, the steel band 21 is plastically deformed into the corrugated shape as shown in FIG. 6b. In the second processing stage, the corrugated steel band 21 is plastically deformed into the shape as shown in FIG. 6c in which the steel band has the ears formed completely and the flange formed partially thereon. In the third processing stage, the partially processed steel band 21 is plastically deformed into the shape as shown in FIG. 6d in which the steel band 21 has the ears 22, 22 formed completely and the flange 26 processed further, and the thus processed steel band is then fed to a seam welding machine (not shown) where the opposite extreme side edges 21a of the rim body are welded to adjacent areas of the body. The processed steel band 21 is then subjected to the fourth processing stage in which the steel band is plastically deformed to form the beads 25, 25 adjacent the inner ends of the hollow ears 22, 22 and the semi-circular recess 23 in the rim body between the extreme side edges 21a, 21a thereof and press the leg portions of the flange 26 towards each other leaving a clearance C therebetween to thereby obtain a substantially complete flanged wheel rim similar to the desired or complete steel flanged wheel rim, see FIG. 6e. The substantially complete steel flanged wheel rim is then fed to a roll-type bending machine 27 (see FIGS. 7 and 8).

The bending machine 27 comprises a presser roll 28, opposing upper (outer) and lower (inner) feed rolls 30, 31 and a bending roll 32. The upper and lower feed rolls 30, 31 are mounted on their drive shafts 33, 35 to be driven thereby in the directions shown by the respective arrows. The peripheral speed of the lower feed roll 31 is slightly higher than that of the upper feed roll 30 and the feed rolls are spaced from each other just sufficient to frictionally contact the opposite sides of the steel band 21. The lower feed roll 31 is a split roll comprising two identical half portions 31a, 31b with a clearance provided therebetween. A drive shaft 35 extends horizontally through the two half portions 31a, 31b and is formed with threads 35a, 35a adjacent the opposite ends. Adjusting nuts 36, 36 and lock nuts 37, 37 are threadedly received on the threads 35a, 35a so that the two half portions 31a, 31b can be releasably fastened towards each other in the direction of arrows A.

Figure 6E:
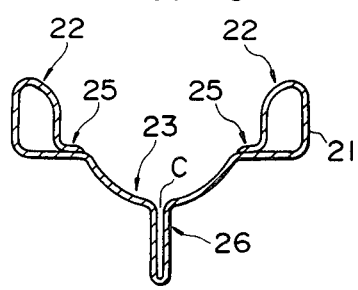

In the production of the steel flanged wheel rim, the leading end of the plastically deformed or processed steel band 21 as shown in FIG. 6e is firmly held between the upper and lower feed rolls 30, 31 and the semi-processed flange 26 is received in the clearance between the two half portions 31a, 31b of the lower feed roll 31. Then, the adjusting nuts 36, 36 are tightened to press the leg portions of the flange 26 together so as to eliminate the clearance C between the leg portions (as shown in the directions of arrows A of FIG. 8) and the flange is maintained in this condition by the lock nuts 37, 37. With the steel band 21 maintained in this condition, when the upper and lower feed rolls 30, 31 are driven or rotated, the leading end of the steel band 21 abuts against the rotating bending roll 32 which causes the steel band end to bend downwardly utilizing the lower feed roll 31 as the fulcrum and the steel band is then continuously bent into a desired or predetermined configuration as the steel band is advanced through the bending machine.

In such a case, since the steel band 21 is pinched between the upper and lower feed rolls 30, 31, the steel band is prevented from deforming undesirably. And especially, the flange 26 may deform into a corrugated configuration under a high compressive load, but since the flange 26 is held under a high compressive load between the two half portions 31a, 31a of the lower feed roll 31 and the lower feed roll 31 has a higher peripheral speed than the upper feed roll 30, the flange 26 is subjected to straightening force to be prevented from deforming inadvertently.

After the steel band 21 has been processed through the bending machine 27 in the manner mentioned hereinabove, the processed steel band 21 is successively subjected to the conventional steps such as a cutting step, a flash butt welding step in which the cut faces are welded together to form an annular member, a machining step, a grinding step and a plating step to form the complete steel flanged wheel rim.

In the illustrated embodiment described hereinabove, although it is contemplated that the two half portions 31a, 31b of the lower feed roll 31 are releasably tightened together by adjusting nuts 36, 36, instead the feed roll portions may be tightened together by means of an oil pressure device without departing from the scope of the present invention. And in the illustrated embodiment, although the lower feed roll 31 has a higher peripheral speed than the upper feed roll 30, the upper and lower feed rolls 30, 31 may have the same peripheral speed. Furthermore, although it has been shown and described hereinabove that the rim has the semi-circular recess 23 having a single layered structure, the recess can be formed as a double-layered structure. And although the processed steel band 21 is fed to the roll-type bending machine 27 while the flange 26 still has the clearance C between the leg portions as shown in FIG. 6e, it is also within the scope of the present invention that the leg portions of the flange 26 be formed as having no clearance provided therebetween and the flange 26 is seam-welded at the base to the recess 23 before the processed steel band 21 is fed to the bending machine 27 whereby a tubeless tire rim can be produced.

As is clear from the foregoing description in connection with the one embodiment of the invention, according to the present invention, in the bending step of the steel band 21 in the production of the steel flanged wheel rim, since the steel band 21 is pinched between the upper and lower feed rolls 30, 31 and especially, the flange 26 is firmly pinched between the two half portions 31a, 31b of the lower feed roll 31, the steel band can be bent without undesirably corrugating the flange 26. Thus, unitary steel flanged wheel rims can be continuously produced by the plastic deformation process through a series of rolls in the various processing stages. Furthermore, the process of the invention can be applicable to the production of steel flanged wheel rims of small diameters as well as large diameter wheel rims.

Although the best mode contemplated for carrying out the present invention has been herein shown and described, it will be apparent that modification and variation may be made without departing from what is regarded to be the subject matter of the invention.

What is claimed is:

1. A process for producing an integral and unitary steel flanged wheel rim, said process comprising:

providing a single steel band, and passing said steel band longitudinally and successively through a series of shaping rolls and therein sequentially plastically deforming said steel band to form a longitudinal wheel rim blank having a cross-sectional configuration including a rim body, a pair of spaced and parallel hollow ears extending outwardly from a first side of said rim body at opposite lateral edges thereof, each said hollow ear including a laterally outer leg portion and a laterally inner leg portion, a pair of beads, each said bead extending laterally inwardly from a laterally inward portion of a respective said inner leg portion of a respective said hollow ear, a recess formed in said rim body laterally centrally thereof between laterally inner ends of said beads, said recess opening at said first side of said rim body and convexly extending from an opposite second side of said rim body, and a flange extending from said second side of said rim body at said convexly extending recess, said flange having a pair of leg portions;

providing a bending machine including presser roll means, outer and inner feed roll means, said inner feed roll means including a pair of axially spaced rolls with a space therebetween, said pair of rolls being axially movable toward and away from each other, and bending roll means;

feeding said blank through said bending machine by rotating said outer and inner feed roll means in contact with said first and second sides, respectively, of said blank;

pressing said presser roll means against said first side of said blank at a position upstream of said feed roll means, and pressing said bending roll means against said first side of said blank at a position downstream of said feed roll means, and thereby bending said blank about said inner feed roll means as a fulcrum and thus forming said blank into a ring-shaped member with said flange extending radially inwardly; and during said steps of feeding and bending, axially moving said pair of rolls of said inner feed roll means together and thereby pressing said leg portions of said flange together and thus substantially preventing radial compression and corrugation of said flange during said step of bending.

2. A process as claimed in claim 1, further comprising rotating said inner feed roll means at a higher peripheral speed than said outer feed roll means.

* * * * *